(12) United States Patent
Horst et al.

(10) Patent No.: US 11,390,311 B2
(45) Date of Patent: Jul. 19, 2022

(54) CHILD STROLLER APPARATUS

(71) Applicant: Wonderland Switzerland AG, Steinhausen (CH)

(72) Inventors: Andrew J. Horst, West Lawn, PA (US); Andrew Ma, Downingtown, PA (US); Daniel A. Sack, Pottstown, PA (US)

(73) Assignee: WONDERLAND SWITZERLAND AG, Steinhausen (CH)

( * ) Notice: Subject to any disclaimer, the term of this patent is extended or adjusted under 35 U.S.C. 154(b) by 11 days.

(21) Appl. No.: 16/869,572

(22) Filed: May 7, 2020

(65) Prior Publication Data
US 2020/0353967 A1 Nov. 12, 2020

Related U.S. Application Data

(60) Provisional application No. 62/845,504, filed on May 9, 2019, provisional application No. 62/941,303, filed on Nov. 27, 2019.

(51) Int. Cl.
*B62B 7/06* (2006.01)
*B62B 9/26* (2006.01)
*B62B 9/20* (2006.01)

(52) U.S. Cl.
CPC .............. *B62B 7/062* (2013.01); *B62B 7/064* (2013.01); *B62B 9/20* (2013.01); *B62B 9/26* (2013.01);
(Continued)

(58) Field of Classification Search
CPC ..... B62B 7/062; B62B 9/20; B62B 2205/003; B62B 2202/42
See application file for complete search history.

(56) References Cited

U.S. PATENT DOCUMENTS 7,255,206 B1 * 8/2007 Hackbarth ............... B62B 5/04
188/19
10,000,226 B2 6/2018 Yi
(Continued)

FOREIGN PATENT DOCUMENTS

| CN | 201769848 U | 3/2011 |
| CN | 105539557 A | 5/2016 |

(Continued)

OTHER PUBLICATIONS

International Search Report of the corresponding PCT Application No. PCT/EP2020/083512 dated Feb. 5, 2021.

*Primary Examiner* — Erez Gurari
(74) *Attorney, Agent, or Firm* — Fay Kaplun & Marcin, LLP (57) ABSTRACT

A child stroller apparatus includes a rear and a front leg frame respectively having a first and a second side segment, a handle frame having a grip portion and a third side segment respectively connected fixedly with a first and a second joining part that are pivotally connected with each other, a latching mechanism for locking the rear and front leg frames and the handle frame in an unfolded state, and a latch carried with the third side segment. The latch can engage and disengage the first joining part to lock and unlock the grip portion relative to the third side segment. Moreover, a linking part couples the latch to the rear leg frame or the front leg frame so that a folding rotation of the handle frame relative to the rear leg frame causes the latch to disengage from the first joining part.

9 Claims, 10 Drawing Sheets

(52) U.S. Cl.
CPC ..... *B62B 2202/42* (2013.01); *B62B 2205/003* (2013.01)

(56) References Cited

U.S. PATENT DOCUMENTS

| | | | |
|---|---|---|---|
| 10,787,188 B2* | 9/2020 | Popp | B62B 9/20 |
| 10,882,546 B2* | 1/2021 | Wang | B62B 7/064 |
| 2007/0164538 A1* | 7/2007 | Yeh | B62B 7/062 |
| | | | 280/642 |
| 2008/0079240 A1* | 4/2008 | Yeh | B62B 7/08 |
| | | | 280/642 |
| 2010/0025968 A1* | 2/2010 | Fritz | B62B 7/08 |
| | | | 280/647 |
| 2017/0144687 A1* | 5/2017 | Li | B62B 7/062 |
| 2017/0313337 A1* | 11/2017 | Horst | B62B 7/062 |
| 2019/0351929 A1* | 11/2019 | Williams | B62B 9/203 |
| 2020/0172142 A1* | 6/2020 | Young | B62B 9/104 |
| 2020/0353967 A1* | 11/2020 | Horst | B62B 7/062 |
| 2020/0353968 A1* | 11/2020 | Horst | B62B 7/14 |
| 2021/0114649 A1* | 4/2021 | Yuan | B62B 9/12 |
| 2021/0129886 A1* | 5/2021 | Zehfuss | B62B 7/062 |

FOREIGN PATENT DOCUMENTS

| | | |
|---|---|---|
| DE | 10 2017 109236 A1 | 11/2017 |
| EP | 2 611 670 A1 | 3/2012 |
| EP | 3 484 758 A1 | 1/2018 |

* cited by examiner

CHILD STROLLER APPARATUS

CROSS-REFERENCE TO RELATED APPLICATION(S)

This application claims priority to U.S. provisional patent application No. 62/845,504 filed on May 9, 2019 and to U.S. provisional patent application No. 62/941,303 filed on Nov. 27, 2019, the disclosure of which is incorporated herein by reference.

BACKGROUND

1. Field of the Invention

The present invention relates to child stroller apparatuses.

2. Description of the Related Art

Caregivers usually rely on a stroller apparatus to transport babies and children. A stroller apparatus is typically constructed from a rigid frame that can be folded for convenient storage or transport and unfolded for use. The construction adopted for the folding mechanism of the stroller apparatus plays an important role in the design of the stroller frame since it has to be safe and convenient to handle in different situations. Moreover, it may be desirable that the stroller frame is capable of receiving a child seat in a forward or a rearward seating configuration according to the needs. Unfortunately, some existing stroller frames that allow a child seat to be installed in multiple seating configurations do not fold to a compact size and are thus more cumbersome to store or transport, which may discourage parents from purchasing these types of stroller apparatuses.

Therefore, there is a need for a child stroller apparatus that can be convenient to fold and unfold, and address at least the foregoing issues.

SUMMARY

The present application describes a child stroller apparatus that is easy to fold and unfold, and can be folded to a compact form.

In one embodiment, the child stroller apparatus includes a rear leg frame having a first side segment, a front leg frame having a second side segment, a handle frame having a third side segment and a grip portion, a latching mechanism operable to lock the rear and front leg frames and the handle frame in an unfolded state, a latch carried with the third side segment, and a linking part. The second and third side segments are respectively connected pivotally with the first side segment, the grip portion being fixedly connected with a first joining part, and the third side segment being fixedly connected with a second joining part that is pivotally connected with the first joining part, whereby the grip portion is rotatable relative to the third side segment between an unfolded position and a folded position. The latch is engaged with the first joining part to lock the grip portion in the unfolded position and disengaged from the first joining part to unlock the grip portion for rotation of the grip portion between the unfolded position and the folded position. The linking part couples the latch to the rear leg frame or the front leg frame so that a folding rotation of the handle frame relative to the rear leg frame causes the latch to disengage from the first joining part for unlocking the grip portion, or the linking part couples the latch to the latching mechanism so that an unlocking movement of the latching mechanism causes the latch to disengage from the first joining part for unlocking the grip portion.

According to another embodiment, the child stroller apparatus includes a rear leg frame having a first side segment fixedly connected with a first coupling part, a front leg frame having a second side segment fixedly connected with a second coupling part, a handle frame having a third side segment and a grip portion pivotally connected with each other, the third side segment being fixedly connected with a third coupling part, the second and third coupling parts being respectively connected pivotally with the first coupling part, a locking part carried with the third coupling part, a latching mechanism operable to lock and unlock the grip portion with respect to the third side segment, and a linking part. The locking part is engaged with the first coupling part for locking the rear and front leg frames and the handle frame in an unfolded state. The linking part couples the locking part to the grip portion so that a folding rotation of the grip portion relative to the third side segment causes the locking part to move and disengage from the first coupling part for unlocking the rear and front leg frames and the handle frame, thereby allowing folding of the child stroller apparatus.

DETAILED DESCRIPTION OF THE EMBODIMENTS

Figure 1:
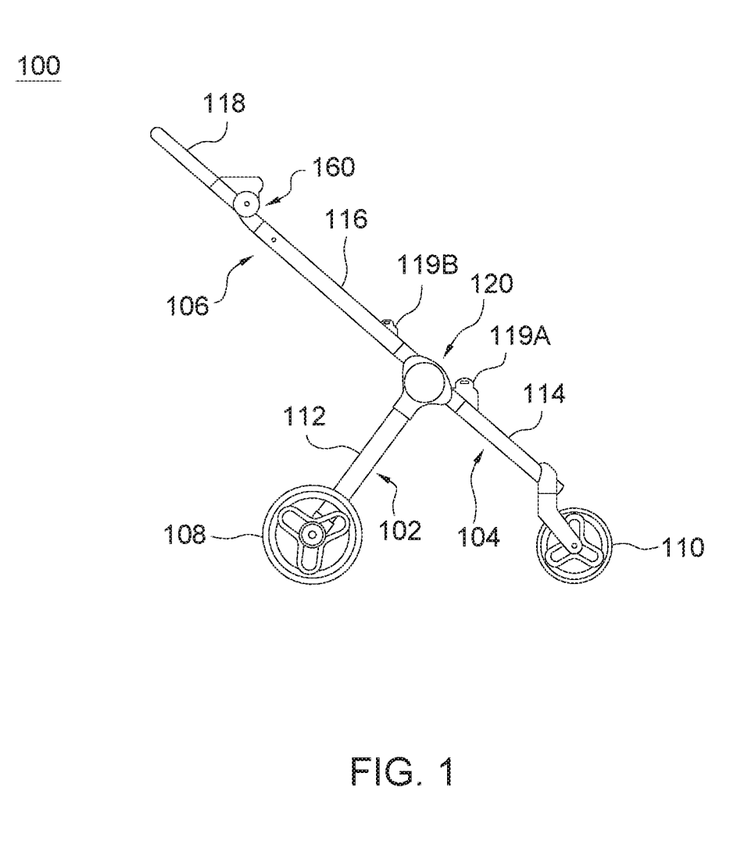
FIG. 1 is a side view illustrating an embodiment of a child stroller apparatus.

FIG. 1 is a side view illustrating an embodiment of a child stroller apparatus 100. Referring to FIG. 1, the child stroller apparatus 100 can include a rear leg frame 102, a front leg frame 104 and a handle frame 106. The rear leg frame 102 and the front leg frame 104 can be respectively provided with wheel assemblies 108 and 110.

Each of the rear leg frame 102, the front leg frame 104 and the handle frame 106 may have a generally symmetrical construction including two parallel side segments respectively disposed at a left and a right side of the child stroller apparatus 100, e.g., two side segments 112 for the rear leg frame 102, two side segments 114 for the front leg frame 104, and two side segments 116 for the handle frame 106. Moreover, the handle frame 106 can further include a grip portion 118 pivotally connected with each of the two side segments 116. For example, the grip portion 118 can extend transversally and have a generally U-shape with two opposite ends thereof respectively connected pivotally with the two side segments 116. The side segments 112, 114 and 116 and the grip portion 118 can include, for example, tube portions. The side segments 112, 114 and 116 at each of the left and right sides are connected with one another via one joint structure 120. The two joint structures 120 on the left and right sides are generally similar in construction, and allow the front leg frame 104 and the handle frame 106 to rotate in unison relative to the rear leg frame 102 for folding and unfolding the child stroller apparatus 100. Moreover, a plurality of seat mounts 119A and 119B may be provided for detachable installation of a child seat. The seat mounts 119A may be assembled with the side segments 114 of the front leg frame 104, and the seat mounts 119B may be assembled with the side segments 116 of the handle frame 106.

Figure 2:
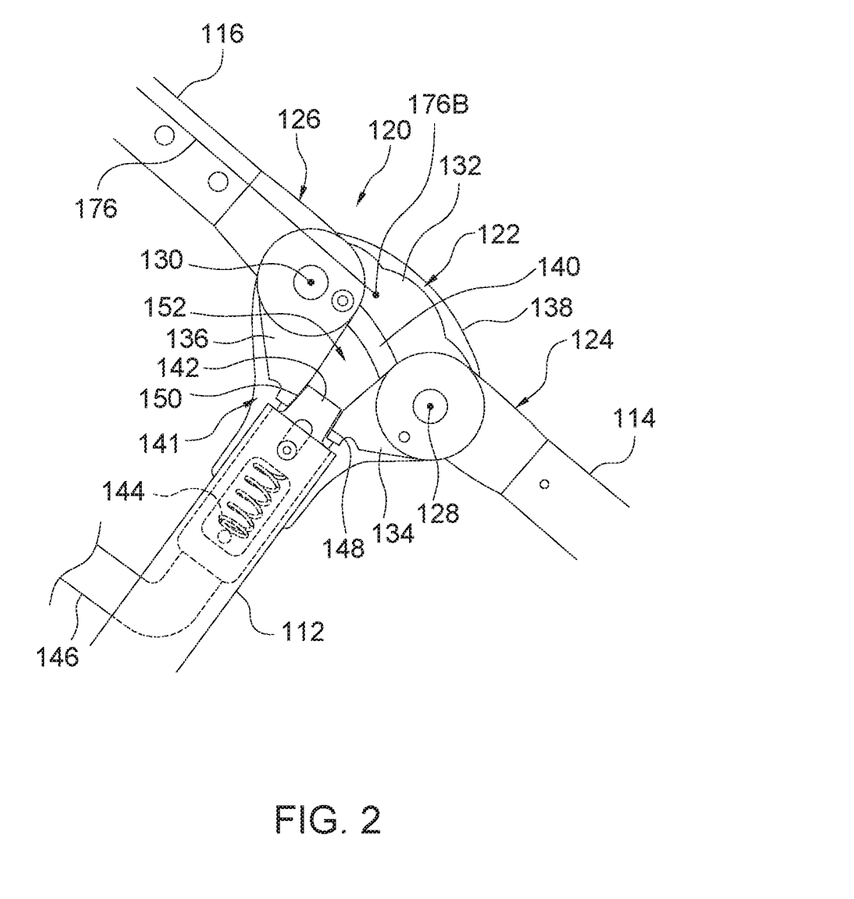
FIG. 2 is a schematic view illustrating some inner construction details of a joint structure used in the child stroller apparatus of FIG. 1.

In conjunction with FIG. 1, FIG. 2 is a schematic view illustrating some inner construction details of the joint structure 120. Referring to FIGS. 1 and 2, the joint structure 120 can include three coupling parts 122, 124 and 126 respectively connected fixedly with the side segment 112 of the rear leg frame 102, the side segment 114 of the front leg frame 104, and the side segment 116 of the handle frame 106. The coupling parts 124 and 126 can be respectively connected pivotally with the coupling part 122 about two pivot axes 128 and 130 spaced apart from each other. For example, the coupling parts 122, 124 and 126 can respectively include rigid plates 132, 134 and 136, and the respective rigid plates 134 and 136 of the coupling parts 124 and 126 can be respectively connected pivotally with the rigid plate 132 of the coupling part 122 about the two pivot axes 128 and 130. In addition, the coupling part 122 may further include a shell 138 that is fixedly attached to the side segment 112 of the rear leg frame 102, the rigid plates 132, 134 and 136 being received at least partially in the shell 138. In this manner, the side segment 114 of the front leg frame 104 and the side segment 116 of the handle frame 106 can be respectively connected pivotally with the side segment 112 of the rear leg frame 102.

Referring to FIG. 2, the joint structure 120 can further include a linking member 140 that rotationally couples the side segment 114 of the front leg frame 104 to the side segment 116 of the handle frame 106, thereby the front leg frame 104 and the handle frame 106 are rotatable in unison relative to the rear leg frame 102 during folding and unfolding of the child stroller apparatus 100. The linking member 140 can be a single part having an elongate shape, and can be enclosed at least partially inside the shell 138. Examples of the linking member 140 can include, without limitation, a rod, a bar, a plate, and the like. A first end of the linking member 140 can be pivotally connected with the coupling part 124 at a location eccentric from the pivot axis 128, and a second end of the linking member 140 can be pivotally connected with the coupling part 126 at a location eccentric from the pivot axis 130.

Referring to FIG. 2, a latch mechanism 141 may be provided to lock the rear and front leg frames 102 and 104 and the handle frame 106 of the child stroller apparatus 100 in an unfolded state for use. The latch mechanism 141 may be respectively assembled adjacent to the joint structure 120 on each of the left and right sides, and can include a locking part 142, a spring 144 and a release actuator 146. The locking part 142 can be movably connected with the coupling part 122, and can be disposed near the coupling parts 124 and 126. The locking part 142 is movable relative to the coupling part 122 to engage with the coupling parts 124 and 126 for locking the rear and front leg frames 102 and 104 and the handle frame 106 in the unfolded state. For example, the locking part 142 can be slidably connected with the coupling part 122, and can engage with an edge surface 148 of the coupling part 124 and an edge surface 150 of the coupling part 126 for locking the child stroller apparatus 100 in the unfolded state. According to an example of construction, the two edge surfaces 148 and 150 can be respectively provided on the two rigid plates 134 and 136. When the rear and front leg frames 102 and 104 and the handle frame 106 are unfolded relative to one another, the two coupling parts 124 and 126 are spaced apart from each other by a gap 152 with the two edge surfaces 148 and 150 facing each other across the gap 152, and the locking part 142 can protrude outward from the side segment 112 into the gap 152 and respectively engage with the two edge surfaces 148 and 150 to lock the child stroller apparatus 100 in the unfolded state. Moreover, the locking part 142 can be retracted into the side segment 112 and disengage from the coupling parts 124 and 126 to allow concurrent rotation of the front leg frame 104 and the handle frame 106 relative to the rear leg frame 102 for folding or unfolding of the child stroller apparatus 100.

The spring 144 can have two opposite ends respectively connected with the locking part 142 and an anchoring feature provided in the side segment 112. The spring 144 can bias the locking part 142 for engagement with the coupling parts 124 and 126 to lock the child stroller apparatus 100 in the unfolded state.

The release actuator 146 is connected with the locking part 142, and is operable to urge the locking part 142 to retract into the side segment 122 and disengage from the coupling parts 124 and 126 for folding rotation of the front leg frame 104 and the handle frame 106 relative to the rear leg frame 102. According to an example of construction, the release actuator 146 may be a strap extending transversally that can connect with the locking part 142 provided on each of the left and right sides of the child stroller apparatus 100. A caregiver can thereby use the release actuator 146 to unlock and lift the child stroller apparatus 100, which can facilitate folding and transport of the child stroller apparatus 100.

Referring to FIG. 1, the grip portion 118 of the handle frame 106 can be respectively connected pivotally with the side segment 116 on each of the left and right sides via a joint structure 160, which is disposed at an end of the side segment 116 that is opposite to the other end of the side segment 116 where is assembled the joint structure 120. The grip portion 118 can thereby rotate relative to the two side segments 116 between an unfolded position where the grip portion 118 generally stretches away from the two side segments 116, and a folded position where the grip portion 118 is folded over the two side segments 116 for reducing the size of the handle frame 106. The grip portion 118 can be in its unfolded position when the child stroller apparatus 100 is in the unfolded state, and in its folded position when the child stroller apparatus 100 is in the folded state.

Figure 3:
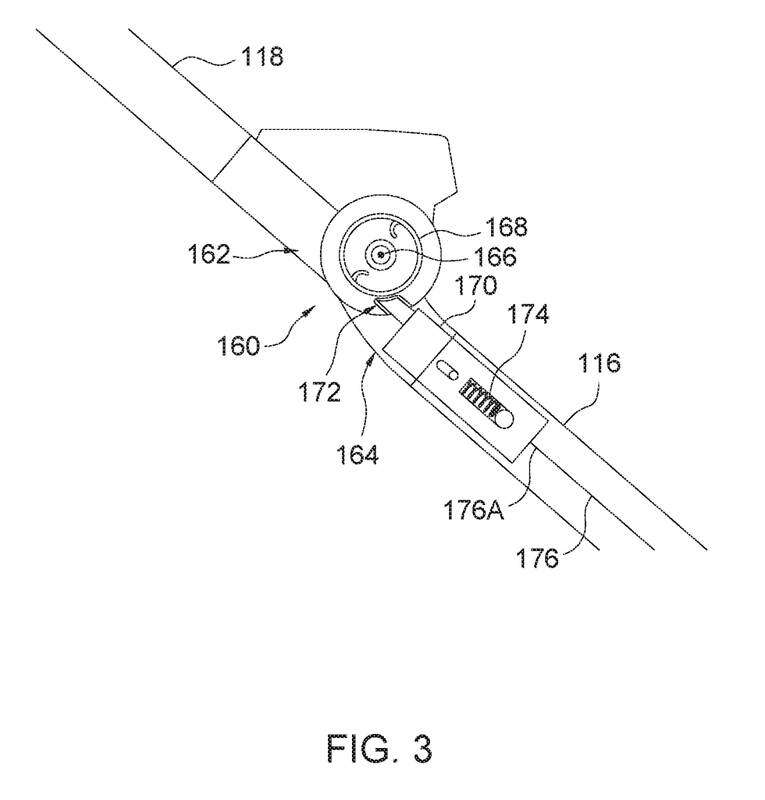
FIG. 3 is a schematic view illustrating some inner construction details of a joint structure that pivotally connects a grip portion with one side segment of a handle frame in the child stroller apparatus of FIG. 1.

FIG. 3 is a schematic view illustrating some inner construction details of a joint structure 160 that pivotally connects the grip portion 118 with one side segment 116. Referring to FIGS. 1 and 3, the joint structure 160 can include two joining parts 162 and 164 respectively connected fixedly with an end of the grip portion 118 and an end of the side segment 116. The joining parts 162 and 164 can be pivotally connected with each other about a pivot axis 166 around which the grip portion 118 is rotatable relative to the side segment 116 between the unfolded position and the folded position. According to an example of construction, the joint structure 160 can further include a spring 168 operable to bias the grip portion 118 toward the folded position. For example, the spring 168 may be a torsion spring respectively connected with the joining parts 162 and 164.

Referring to FIG. 3, the handle frame 106 can be further assembled with a latch 170 operable to rotationally lock the grip portion 118 with respect to the side segment 116. The latch 170 can be carried with the side segment 116, and can engage with the joining part 162 for locking the grip portion 118 in the unfolded position relative to the side segment 116 and disengage from the joining part 162 for rotation of the grip portion 118 relative to the third side segment 116. For example, the latch 170 can engage with an opening 172 provided on the joining part 162 to lock the grip portion 118 in the unfolded position, and can disengage from the opening 172 to unlock the grip portion 118 so that the grip portion 118 can rotate relative to the side segment 116 and the latch 170 between the unfolded position and the folded position. According to an example of construction, the latch 170 may be slidably connected with the side segment 116, and can slide relative to the side segment 116 along an axis that is substantially orthogonal to the pivot axis 166. Accordingly, the latch 170 can slide in a first direction to engage with the joining part 162 for locking the grip portion 118 in the unfolded position, and slide in an opposite second direction to disengage from the joining part 162 to unlock the grip portion 118. A spring 174 may be provided to bias the latch 170 to engage with the joining part 162. For example, the spring 174 can have two opposite ends respectively connected with the latch 170 and the side segment 116.

Referring to FIGS. 2 and 3, the latch 170 may be operatively coupled to the rear leg frame 102 via a linking part 176 so that a folding rotation of the handle frame 106 relative to the rear leg frame 102 can cause the latch 170 to move and unlock the grip portion 118. According to an example of construction, the linking part 176 can include a cable having an end 176A connected with the latch 170 and another end 176B connected with the coupling part 122, wherein the end 176B can be exemplary anchored to the rigid plate 132 or the shell 138 of the coupling part 122 at a location offset from the pivot axis 130.

According to another embodiment, the folding rotation of the handle frame 106 relative to the rear leg frame 102 may likewise cause the latch 170 to move and unlock the grip portion 118 with a connecting structure in which the linking part 176 operatively couples the latch 170 to the front leg frame 104. For example, the linking part 176 can include a cable having the end 176A connected with the latch 170 and the other end 176B connected with the coupling part 124, wherein the end 176B can be exemplary anchored to the rigid plate 134 of the coupling part 124.

Figure 4:
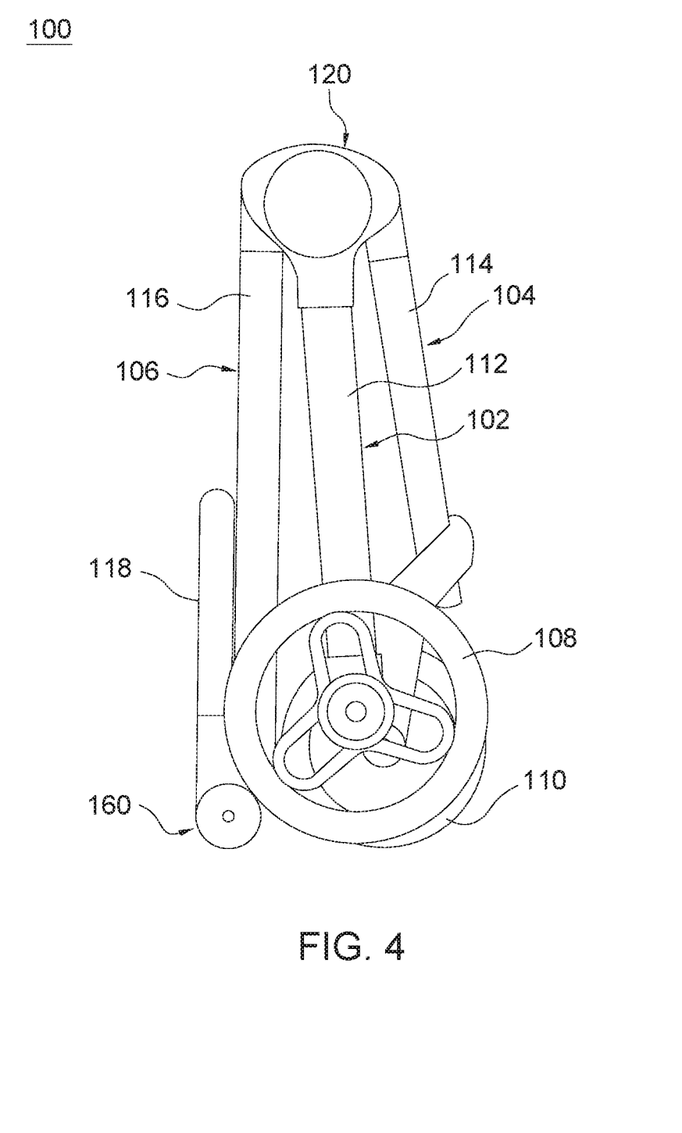
FIG. 4 is a side view illustrating the child stroller apparatus of FIG. 1 in a folded state and the grip portion in the folded position.

When the handle frame 106 rotates about the pivot axis 130 relative to the rear leg frame 102 in a folding direction (i.e., for folding the child stroller apparatus 100), the coupling part 122 (or coupling part 124) connected with the end 176B can exert a pulling force on the linking part 176, which can be tensioned and consequently pull the latch 170 to move relative to the side segment 116 and disengage from the joining part 162. As a result, the grip portion 118 is unlocked and can rotate relative to the side segments 116 under the biasing force of the spring 168 from the unfolded position to the folded position. Folding of the handle frame 106 to a reduced size can thus be facilitated, which can occur concurrently to the folding rotation of the front leg frame 104 and the handle frame 106 relative to the rear leg frame 102. The child stroller apparatus 100 is thereby foldable to a compact size with the side segments 114 of the front leg frame 104 and the side segments 116 of the handle frame 106 respectively positioned generally parallel to and at two opposite sides of the side segments 112 of the rear leg frame 102. The grip portion 118 may be folded to a side of the side segments 116 that allows the side segments 116 to be positioned close to the side segments 112 of the rear leg frame 102 in the folded state of the child stroller apparatus 100, i.e., the side segments 116 can be located between the folded grip portion 118 and the side segments 112 in the folded state. FIG. 4 illustrates the child stroller apparatus 100 in the folded state and the grip portion 118 in the folded position.

The pulling force exerted by the coupling part 122 (or coupling part 124) through the linking part 176 can be reduced or removed when the handle frame 106 rotates about the pivot axis 130 relative to the rear leg frame 102 in an unfolding direction (i.e., for unfolding the child stroller apparatus 100). As a result, once the child stroller apparatus 100 is fully unfolded and the grip portion 118 is rotated from the folded position to the unfolded position, the latch 170 can engage with the joining part 162 under the biasing force of the spring 174 to lock the grip portion 118 in the unfolded position.

According to another embodiment, the linking part 176 can include a cable having the end 176A connected with the latch 170 and the other end 176B connected with the latch mechanism 141, wherein the end 176B can be exemplary anchored to the locking part 142. When the locking part 142 disengages from between the coupling parts 124 and 126, the linking part 176 can be tensioned by the unlocking movement of the locking part 142 and consequently pull the latch 170 to move relative to the side segment 116 and disengage from the joining part 162. The handle frame 106 can be thereby folded into a compact form, which can occur concurrently to the folding rotation of the front leg frame 104 and the handle frame 106 relative to the rear leg frame 102.

Figure 5:
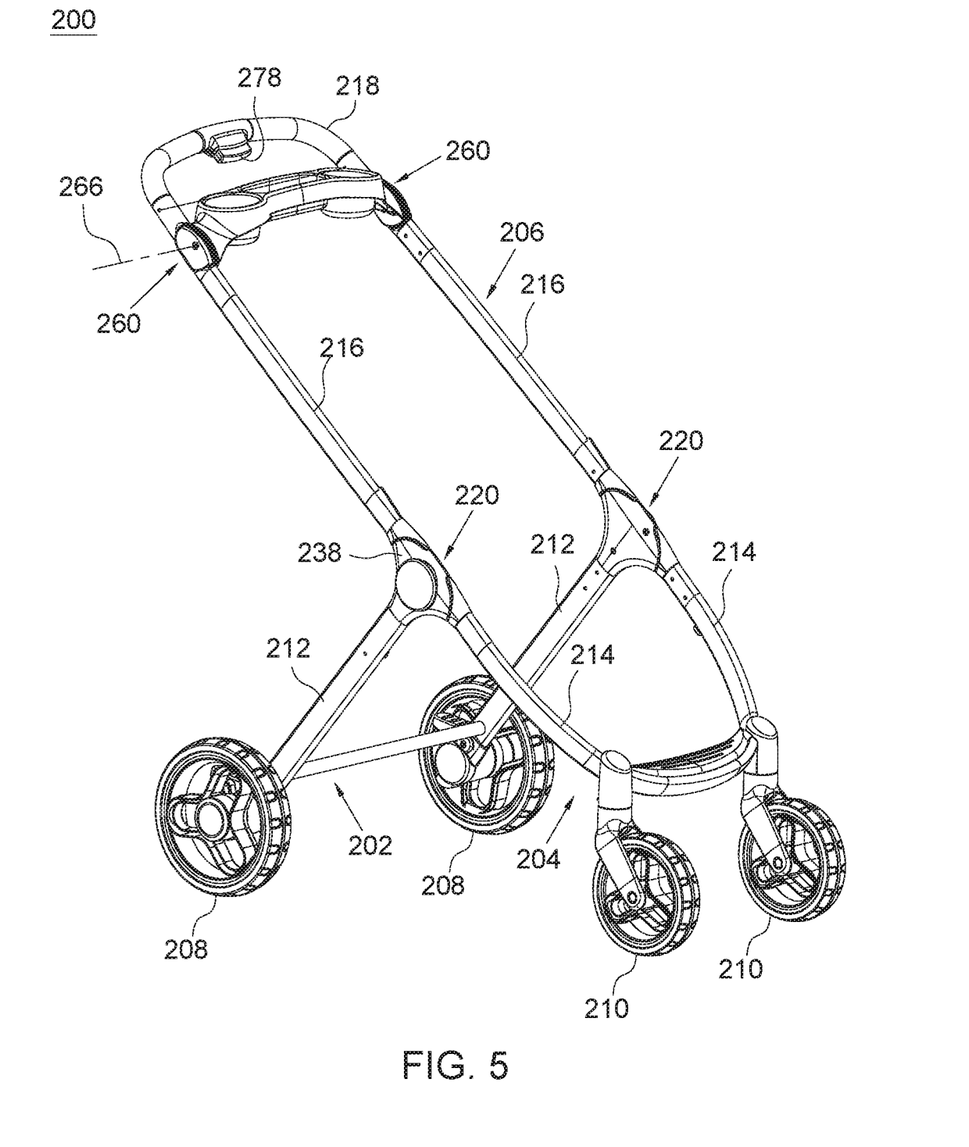
FIG. 5 is a perspective view illustrating another embodiment of a child stroller apparatus.
Figure 6:
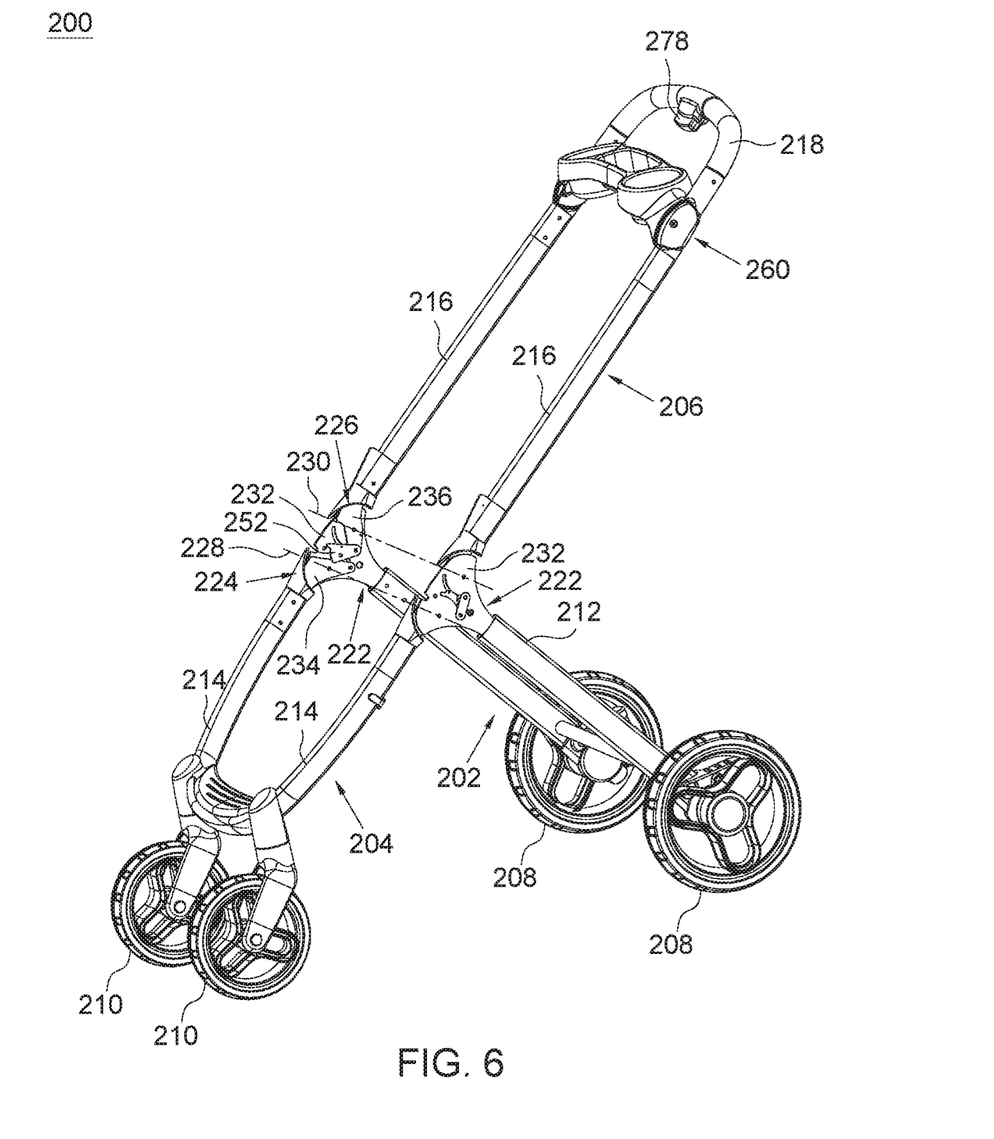
FIG. 6 is another perspective view illustrating the child stroller apparatus of FIG. 5.

FIGS. 5 and 6 are two perspective views illustrating another embodiment of a child stroller apparatus 200. Referring to FIGS. 5 and 6, the child stroller apparatus 200 can likewise include a rear leg frame 202, a front leg frame 204 and a handle frame 206. The rear leg frame 202 and the front leg frame 204 can be respectively provided with wheel assemblies 208 and 210. Each of the rear leg frame 202, the front leg frame 204 and the handle frame 206 may have a generally symmetrical construction including two parallel side segments respectively disposed at a left and a right side of the child stroller apparatus 200, e.g., two side segments 212 for the rear leg frame 202, two side segments 214 for the front leg frame 204, and two side segments 216 for the handle frame 206. Moreover, the handle frame 206 can further include a grip portion 218 pivotally connected with each of the two side segments 216. For example, the grip portion 218 can extend transversally and have a generally U-shape with two opposite ends thereof respectively connected pivotally with the two side segments 216. The side segments 212, 214 and 216 and the grip portion 218 can include, for example, tube portions. The side segments 212, 214 and 216 at each of the left and right sides are connected with one another via one joint structure 220. The two joint structures 220 on the left and right sides are generally similar in construction, and allow the front leg frame 204 and the handle frame 206 to rotate in unison relative to the rear leg frame 202 for folding and unfolding the child stroller apparatus 200.

In conjunction with FIGS. 5 and 6, FIGS. 7 and 8 are two schematic views illustrating some inner construction details of the joint structure 220 from two opposite sides. Referring to FIGS. 5-8, the joint structure 220 can include three coupling parts 222, 224 and 226 respectively connected fixedly with the side segment 212 of the rear leg frame 202, the side segment 214 of the front leg frame 204, and the side segment 216 of the handle frame 206. The coupling parts 224 and 226 can be respectively connected pivotally with the coupling part 222 about two pivot axes 228 and 230 spaced apart from each other. For example, the coupling parts 222, 224 and 226 can respectively include rigid plates 232, 234 and 236, and the respective rigid plates 234 and 236 of the coupling parts 224 and 226 can be respectively connected pivotally with the rigid plate 232 of the coupling part 222 about the two pivot axes 228 and 230. In addition, the coupling part 222 may further include a shell 238 that is fixedly attached to the side segment 212 of the rear leg frame 202, the rigid plates 232, 234 and 236 being received at least partially in the shell 238. In this manner, the side segment 214 of the front leg frame 204 and the side segment 216 of the handle frame 206 can be respectively connected pivotally with the side segment 212 of the rear leg frame 202.

Figure 8:
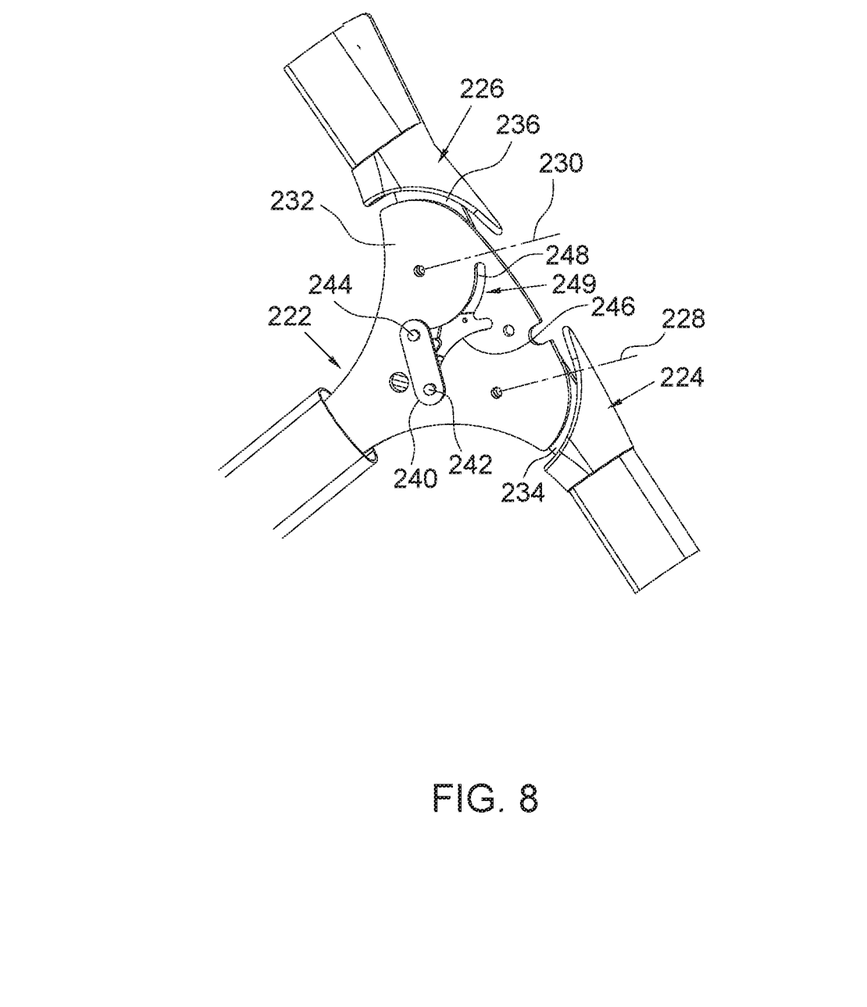

Referring to FIGS. 6 and 8, the joint structure 220 can further include a linking member 240 that rotationally couples the side segment 214 of the front leg frame 204 to the side segment 216 of the handle frame 206, thereby the front leg frame 204 and the handle frame 206 are rotatable in unison relative to the rear leg frame 202 during folding and unfolding of the child stroller apparatus 200. The linking member 240 can be a single part having an elongate shape, and can be enclosed at least partially inside the shell 238. Examples of the linking member 240 can include, without limitation, a rod, a bar, a plate, and the like. A first end of the linking member 240 can be pivotally connected with the coupling part 224 via a pivot connection 242 at a location eccentric from the pivot axis 228, and a second end of the linking member 240 can be pivotally connected with the coupling part 226 via a pivot connection 244 at a location eccentric from the pivot axis 230. The pivot connections 242 and 244 can exemplary include pins or shaft portions. Moreover, the coupling part 222 may include two guide surfaces 246 and 248 adapted to provide guiding support for the linking member 240. For example, the two guide surfaces 246 and 248 may be defined as wall surfaces of a guide slot 249 provided in the rigid plate 232 of the coupling part 222, and the two pivot connections 242 and 244 may be disposed in the guide slot 249 respectively in sliding contact with the two guide surfaces 246 and 248.

Figure 7:
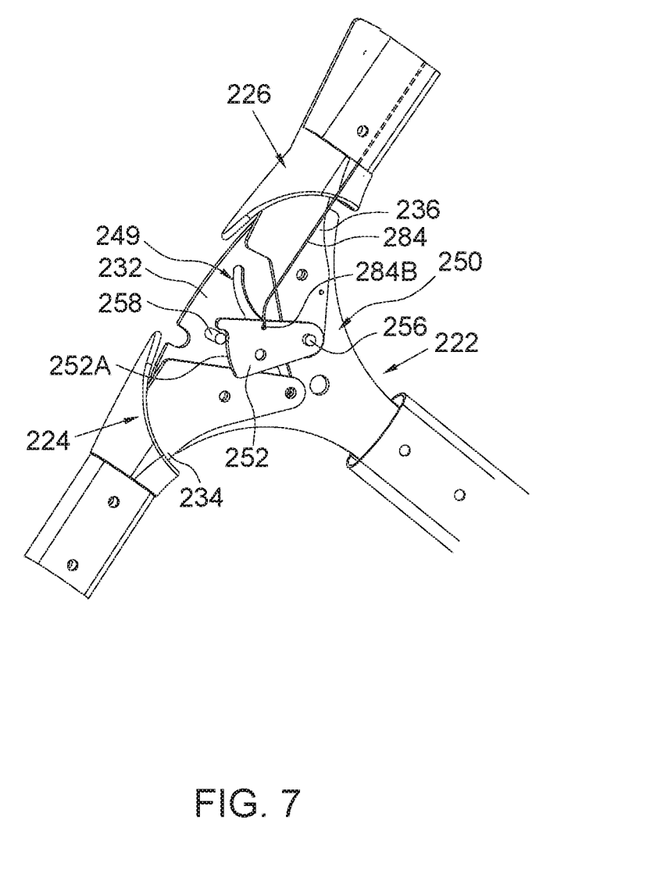
FIGS. 7 and 8 are two schematic views illustrating some inner construction details of a joint structure used in the child stroller apparatus of FIGS. 5 and 6.

Referring to FIGS. 6 and 7, a latch mechanism 250 may be provided to lock the rear and front leg frames 202 and 204 and the handle frame 206 of the child stroller apparatus 200 in an unfolded state for use. The latch mechanism 250 may be respectively assembled adjacent to the joint structure 220 on each of the left and right sides, and can include a locking part 252 carried with the coupling part 226. The locking part 252 can be pivotally connected with the coupling part 226 (e.g., the rigid plate 236 thereof) via a pin 256. The locking part 252 is rotatable relative to the coupling part 226 to engage with the coupling part 222 for locking the rear and front leg frames 202 and 204 and the handle frame 206 in the unfolded state, or disengage from the coupling part 222 for unlocking the rear and front leg frames 202 and 204 and the handle frame 206 for folding rotation. For example, the locking part 252 can engage with a lock pin 258 fixedly connected with the rigid plate 232 of the coupling part 222 for locking the rear and front leg frames 202 and 204 and the handle frame 206 in the unfolded state, and disengage from the lock pin 258 to allow concurrent rotation of the front leg frame 204 and the handle frame 206 relative to the rear leg frame 202 for folding or unfolding of the child stroller apparatus 200.

Figure 10:
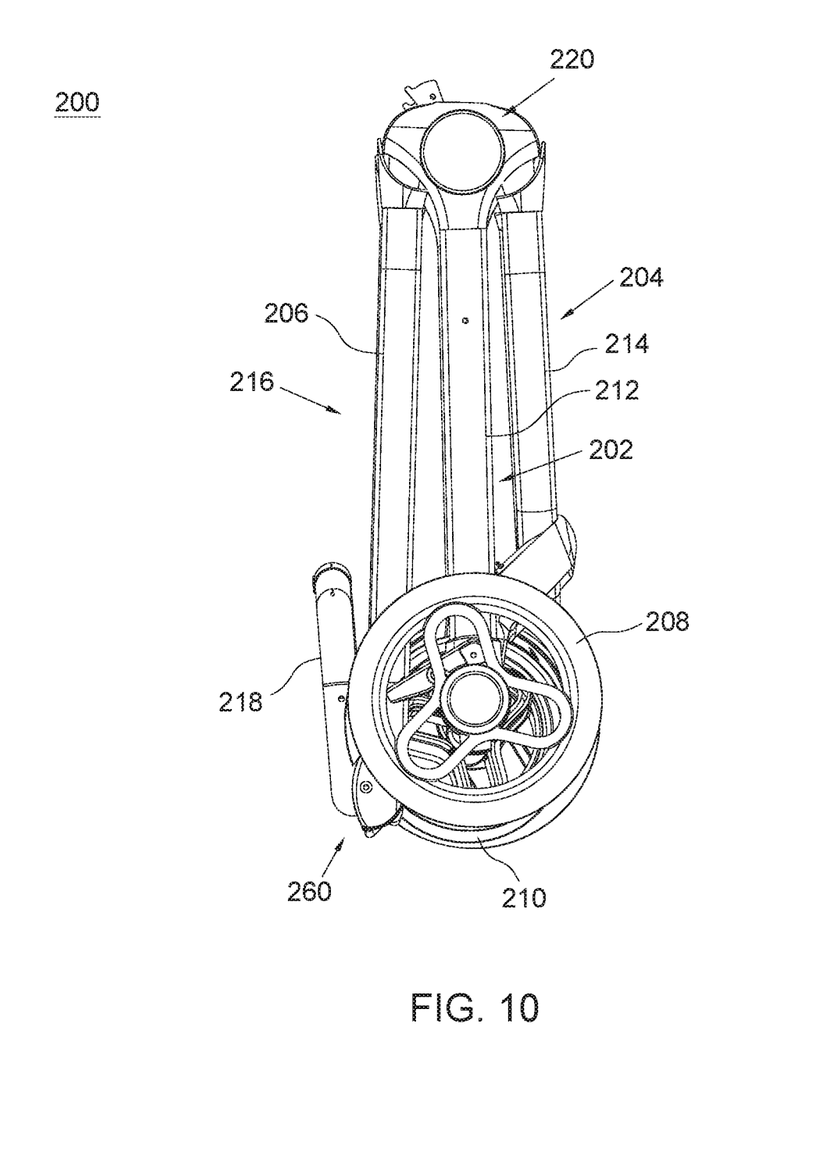
FIG. 10 is a side view illustrating the child stroller apparatus of FIG. 5 in the folded state and the grip portion thereof in the folded position.

Referring to FIGS. 5 and 6, the grip portion 218 of the handle frame 206 can be respectively connected pivotally with the side segment 216 on each of the left and right sides via a joint structure 260, which is disposed at an end of the side segment 216 that is opposite to the other end of the side segment 216 where is assembled the joint structure 220. The grip portion 218 of the handle frame 206 can thereby rotate relative to the two side segments 216 between an unfolded position where the grip portion 218 generally stretches away from the two side segments 216, and a folded position where the grip portion 218 is folded over the two side segments 216 for reducing the size of the handle frame 206. The grip portion 218 can be in its unfolded position when the child stroller apparatus 200 is in the unfolded state as shown in FIG. 5, and in its folded position when the child stroller apparatus 200 is in the folded state as shown in FIG. 10.

Figure 9:
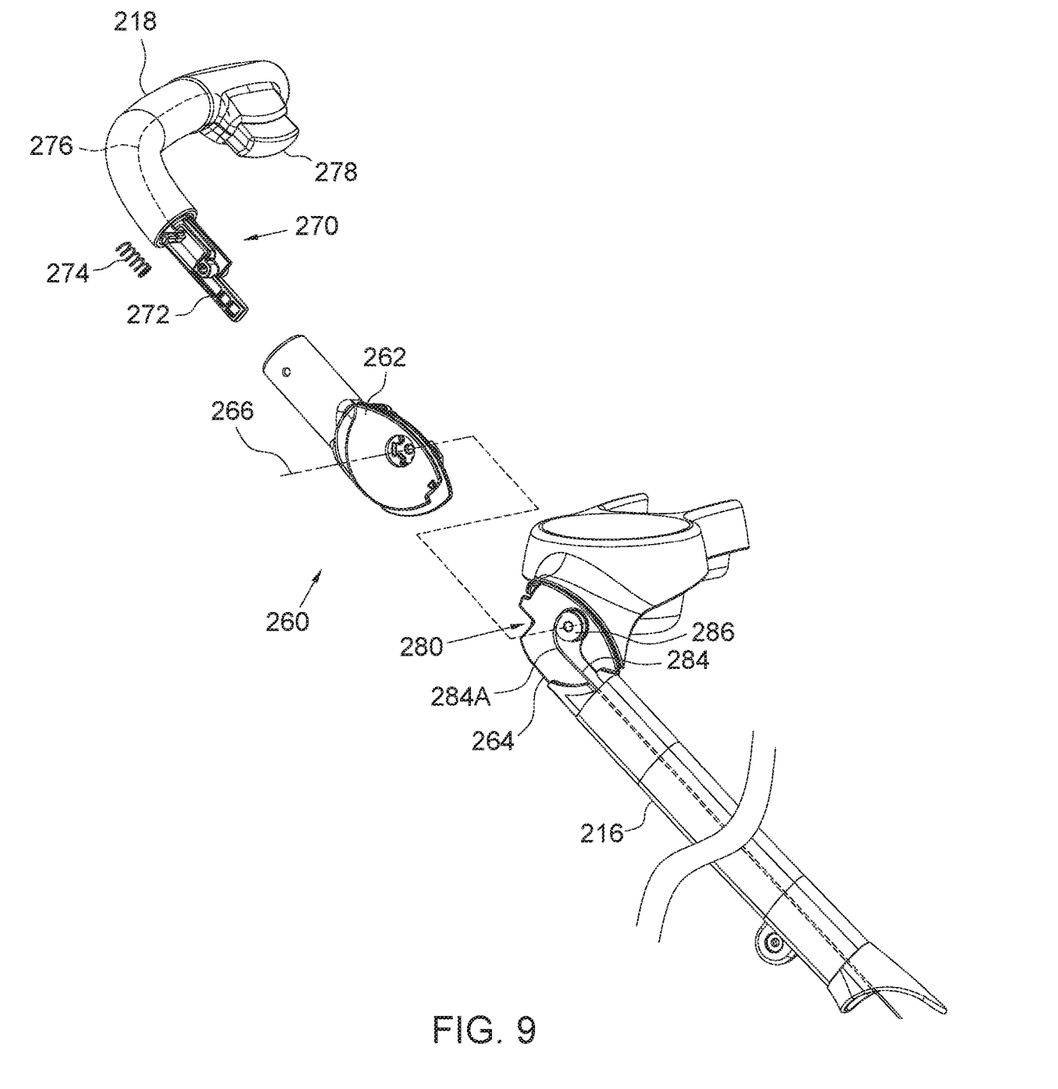
FIG. 9 is a partially exploded view illustrating some inner construction details of a joint structure that pivotally connects a grip portion with one side segment of a handle frame in the child stroller apparatus of FIGS. 5 and 6.

FIG. 9 is a partially exploded view illustrating some inner construction details of a joint structure 260 that pivotally connects the grip portion 218 with one side segment 216. Referring to FIGS. 5, 6 and 9, the joint structure 260 can include two joining parts 262 and 264 respectively connected fixedly with an end of the grip portion 218 and an end of the side segment 216. The joining parts 262 and 264 can be pivotally connected with each other about a pivot axis 266 around which the grip portion 218 is rotatable relative to the side segment 216 between the unfolded position and the folded position.

Referring to FIG. 9, the handle frame 206 can be assembled with a latching mechanism 270 operable to lock and unlock the grip portion 218 with respect to the side segment 216. The latching mechanism 270 can include a latch 272, a spring 274, a cable 276 and a release actuator 278. The latch 272 is operable to rotationally lock the grip portion 218 with respect to the side segment 216. For example, the latch 272 can be carried with the grip portion 218, and is movable to engage with an opening 280 provided on the joining part 264 to lock the grip portion 218 in the unfolded position with respect to the side segment 216 or to disengage from the opening 280 to unlock the grip portion 218 with respect to the side segment 216 so that the grip portion 218 can rotate relative to the side segment 216 between the unfolded position and the folded position. According to an example of construction, the latch 272 may be slidably connected with the grip portion 218, and can slide relative to the grip portion 218 along an axis that is substantially orthogonal to the pivot axis 266. Accordingly, the latch 272 can slide in a first direction to engage with the joining part 264 for locking the grip portion 218 in the unfolded position, and slide in an opposite second direction to disengage from the joining part 264 to unlock the grip portion 218 and allow its rotation between the unfolded position and the folded position.

The spring 274 may be provided to bias the latch 272 to engage with the joining part 264. For example, the spring 274 have two opposite ends respectively connected with the latch 272 and the joining part 262 or grip portion 218.

The release actuator 278 can be disposed on the grip portion 218 at a location distant from the latch 272, and can be operatively connected with the latch 272 via the cable 276. According to an example of construction, the release actuator 278 may be a push button disposed on a transversal section of the grip portion 218. The release actuator 278 is operable to pull the cable 276 and cause the latch 272 to move against the biasing force of the spring 274 and disengage from the joining part 264, which can thereby unlock the grip portion 218 with respect to the side segment 216.

The same assembly comprised of the latch 272, the spring 274 and the cable 276 may be provided at each of the left and right sides of the handle frame 206 so that the latching mechanism 270 can lock and unlock the grip portion 218 with respect to each of the two side segments 216.

Referring to FIGS. 7 and 9, the locking part 252 may be operatively coupled to the grip portion 218 via a linking part 284 so that a folding rotation of the grip portion 218 relative to the two side segments 216 can cause the locking part 252 to move and disengage from the coupling part 222 for unlocking the rear and front leg frames 202 and 204 and the handle frame 206, thereby allowing folding of the child stroller apparatus 200. According to an example of construction, the linking part 284 can include a cable having an end 284A connected with the grip portion 218 and another end 284B connected with the locking part 252. For example, the grip portion 218 may be fixedly connected with a barrel 286, and the end 284A of the linking part 284 can be anchored to the barrel 286. The linking part 284 can at least partially wrap around the barrel 286 and pull the locking part 252 to disengage from the coupling part 222 when the barrel 286 rotates along with the grip portion 218 in a direction for folding the grip portion 218 over the side segments 216.

When the grip portion 218 rotates relative to the two side segments 216 in the folding direction, the grip portion 218 can pull the linking part 284 and urge the locking part 252 to concurrently rotate for disengaging from the coupling part 222. The rear and front leg frames 202 and 204 and the handle frame 206 can be thereby unlocked for folding the child stroller apparatus 200.

The pulling force exerted by the grip portion 218 through the linking part 284 can be reduced or removed when the grip portion 218 rotates relative to the two side segments 216 in an unfolding direction. Once the child stroller apparatus 200 is fully unfolded and the grip portion 218 is rotated from the folded position to the unfolded position, the locking part 252 can thus rotate and engage with the coupling part 222 to lock the rear and front leg frames 202 and 204 and the handle frame 206 in the unfolded position. According to an example of construction, the locking part 252 may rotate under gravity action for engaging with the coupling part 222 as the pulling force exerted through the linking part 284 is removed. According to another example of construction, the locking part 252 may be coupled to a spring (not shown) adapted to apply a biasing force that can facilitate movement of the locking part 252 for engaging with the coupling part 222.

With the aforementioned construction, the rear and front leg frames 202 and 204 and the handle frame 206 can be unlocked for folding of the child stroller apparatus 200 by rotating the grip portion 218 from the unfolded position toward the folded position. For a safer use, it may be desirable to ensure that the locking part 252 fully disengages from the coupling part 222 and effectively unlocks the rear and front leg frames 202 and 204 and the handle frame 206 only after the grip portion 218 has rotated a substantial angle from the unfolded position toward the folded position. According to an example of construction, the locking part 252 may have an edge 252A that remains engaged with the lock pin 258 and prevents folding of the child stroller apparatus 200 as long as the grip portion 218 has rotated less than a buffer angle from the unfolded position toward the folded position. The locking part 252 and the edge 252A thereof can be fully disengaged from the lock pin 258 only after the grip portion 218 has rotated more than the buffer angle from the unfolded position. In this manner, unintentional folding of the child stroller apparatus 200 may be prevented.

Advantages of the structures described herein include the ability to provide a handle frame having two side segments and a grip portion that can be folded to reduce the size of the handle frame for compact storage and easy transport of the child stroller apparatus. Moreover, the folding of the grip portion relative to the side segments of the handle frame can be operatively linked to the mechanism used for folding the leg frames of the child stroller apparatus, which can make the child stroller apparatus easier to fold.

Realization of the child stroller apparatuses has been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A child stroller apparatus comprising:
   a rear leg frame having a first side segment fixedly connected with a first coupling part;
   a front leg frame having a second side segment fixedly connected with a second coupling part, and a handle frame having a third side segment and a grip portion pivotally connected with each other, the third side segment being fixedly connected with a third coupling part, the second and third coupling parts being respectively connected pivotally with the first coupling part;
   a locking part carried with the third coupling part, the locking part being engaged with the first coupling part for locking the rear and front leg frames and the handle frame in an unfolded state, wherein the first coupling part includes a rigid plate, and the locking part engages with a lock pin fixedly connected with the rigid plate for locking the rear and front leg frames and the handle frame in the unfolded state;
   a latching mechanism operable to lock and unlock the grip portion with respect to the third side segment; and
   a linking part coupling the locking part to the grip portion so that a folding rotation of the grip portion relative to the third side segment causes the locking part to move and disengage from the first coupling part for unlocking the rear and front leg frames and the handle frame, thereby allowing folding of the child stroller apparatus.

2. The child stroller apparatus according to claim 1, wherein the linking part includes a cable having a first end connected with the grip portion and a second end connected with the locking part.

3. The child stroller apparatus according to claim 2, wherein the grip portion is fixedly connected with a barrel, and the first end is anchored to the barrel.

4. The child stroller apparatus according to claim 1, wherein the second and third coupling parts are respectively connected pivotally with the first coupling part about two pivot axes spaced apart from each other.

5. The child stroller apparatus according to claim 1, wherein the second and third coupling parts are pivotally connected with a linking member, thereby the front leg frame and the handle frame are rotatable in unison relative to the rear leg frame during folding and unfolding of the child stroller apparatus.

6. The child stroller apparatus according to claim 5, wherein the linking member is respectively connected with the second and third coupling parts via a first and a second pivot connection that are respectively in sliding contact with a first and a second guide surface provided on the first coupling part.

7. The child stroller apparatus according to claim 1, wherein the grip portion and the third side segment are respectively connected fixedly with a first and a second joining part that are pivotally connected with each other, and the latching mechanism includes a latch carried with the grip portion, the latch being movable to engage with the second joining part for locking the grip portion with respect to the third side segment or to disengage from the second joining part for unlocking the grip portion with respect to the third side segment.

8. The child stroller apparatus according to claim 7, wherein the latch is slidably connected with the grip portion.

9. The child stroller apparatus according to claim 7, wherein the latching mechanism further includes a spring operable to bias the latch to engage with the second joining part, and a release actuator operatively connected with the latch via a cable, the release actuator being operable to pull the cable and cause the latch to move and disengage from the second joining part.

* * * * *